July 29, 1958     E. H. BOWLER ET AL     2,845,607
HOWLING COMBUSTION WARNING DEVICE FOR JET ENGINES
Filed Oct. 31, 1955                                2 Sheets-Sheet 1

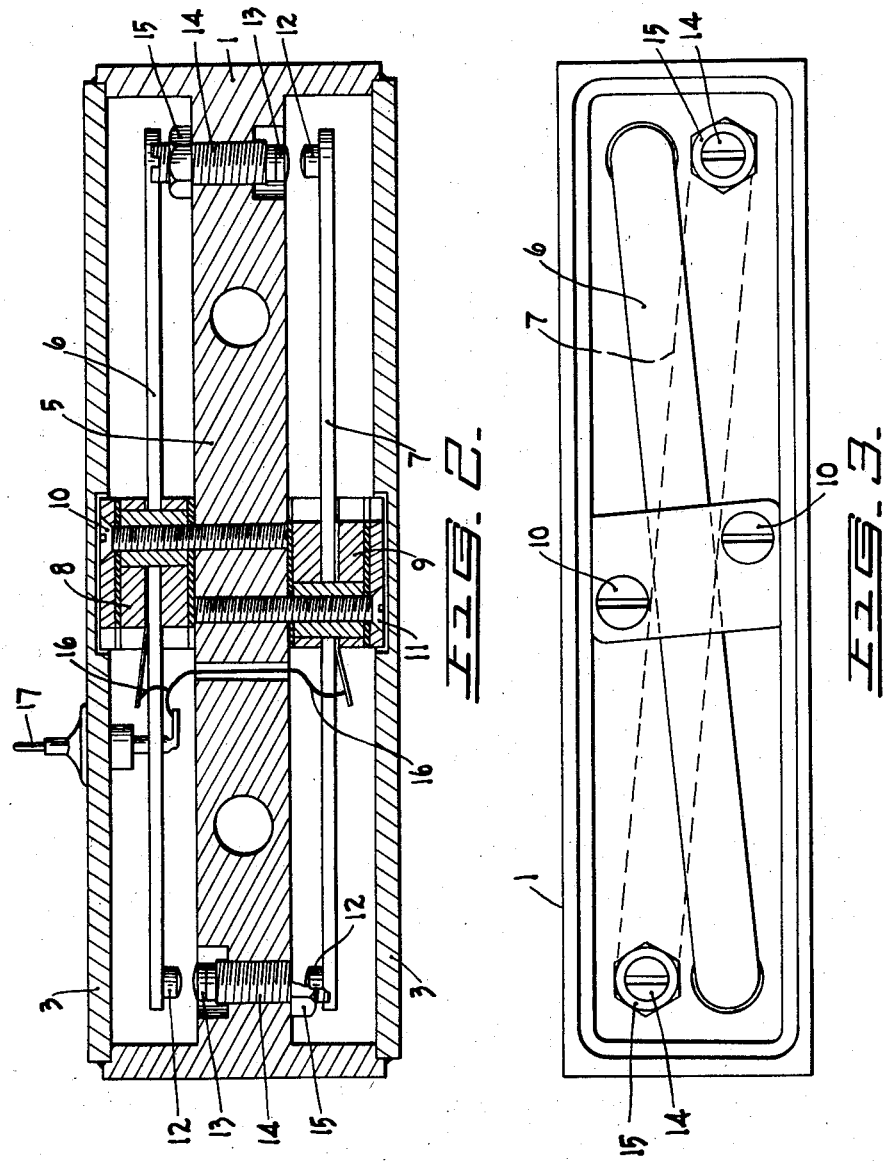

2,845,607

HOWLING COMBUSTION WARNING DEVICE FOR JET ENGINES

Ernest Haydn Bowler, Ottawa, Ontario, and Gordon Maguire Wright, Westboro, Ontario, Canada, assignors to National Research Council, Ottawa, Canada, a corporation of Canada Application October 31, 1955, Serial No. 543,800

1 Claim. (Cl. 340—27)

This invention relates to improvements in jet engines and is particularly concerned with the avoidance of the phenomenon known as howling combustion (sometimes also known as "screeching" or "screaming") which is experienced in jet engines, particularly when operating with reheat (sometimes also known as afterburning).

Howling in the jet pipe of a jet engine is a noise which is produced by high frequency oscillations of the gas column in the jet pipe. It is believed that the oscillations that give rise to howling take place in a direction transverse to the longitudinal axis of the jet pipe and these oscillations often exert a destructive effect on various components of the engine as well as being accompanied by an increase in the rate of heat transfer. Howling combustion has been known to lead to the destruction of the metal of jet pipes and flameholders, to crack open welded seams and bosses, to break ignitors and thermocouples, and to loosen bolts and rivets.

The present invention is concerned with the provision of means for warning the operator of a jet engine (e. g. the pilot of an aircraft, or the engineer in charge of a test installation) that howling combustion is taking place or is about to take place. Although, as its name implies, howling combustion is normally accompanied by a comparatively large noise, it is not always possible for the pilot of an aircraft that may be flying at or above the speed of sound, to identify the audible symptom of howling combustion, especially as his attention may be directed to other matters. Similarly, in a test installation, it is highly desirable to anticipate the audible onset of howling.

When howling combustion commences, the amplitude of vibration builds up rapidly and it is most important to obtain early indication that howling combustion is beginning so that immediate remedial action can be taken by moving the throttle to reduce the fuel being fed to the engine.

In accordance with the present invention, there is provided, mounted physically on the jet pipe of a jet engine, a device comprising at least one reed arranged to oscillate at a frequency substantially equal to a frequency of vibration accompanying howling combustion in said engine. The frequency of the transverse oscillations that constitute such howling combustion depend largely on engine geometry and may vary with conditions such as ambient temperature and pressure. Normally, howling combustion will not consist of a simple pure note but will comprise either a frequency modulated oscillation, or a group of oscillations of frequencies close to one another, or both. These frequencies will lie within a comparatively definite range of frequencies, for any particular type of engine, although they may fluctuate somewhat within this range in accordance with temperature and pressure fluctuations and the operating conditions of the engine. The howling combustion vibrations experienced in a reheated Rolls Royce Derwent engine, for example, may be expected to lie within the range of 500 to 700 cycles per second.

When the engine is mounted on a test bed so that temperature and pressure fluctuations are small, the howling combustion frequencies experienced will normally be subject to only slight fluctuation and may prove sufficient to employ a single reed to detect such howling combustion. In view of the importance of being certain of obtaining early and uninterrupted warning of such condition, however, and because of the far greater temperature and pressure fluctuations that an engine mounted in an aircraft may be expected to experience, it is preferred, especially when the engine is in an aircraft, to use a plurality of reeds each tuned to a slightly different frequency so as to provide a wider band of frequencies to which the device is sensitive.

In a preferred form of the invention, the reeds are arranged to give indication of their oscillation by means of contacts carried at their free ends that co-operate with stationarily mounted contacts. Other methods of detecting oscillation of a reed at the amplitude indicative of howling combustion, could be used, but the above method has the added advantage that it effectively broadens the frequency response of each reed. Theoretically each reed has a very sharp frequency response, but the normal conditions of oscillation are upset as soon as contact is made at the free end of the reed, and this has been found to have the effect of considerably broadening the frequency response of the reed in respect of continuing oscillation. That is to say, that, although it will normally be necessary for the stimulating vibrations initially to be within a few cycles of the resonant frequency of the reed in order to start its oscillation, such oscillation will continue due to the contact rebound effect even if the frequency of the stimulating vibrations becomes significantly different from the resonant frequency of the reed. As a result, a single reed, once excited, can provide a continuous warning over a definite band of frequencies. By using a plurality of reeds tuned to different frequencies, it is possible to arrange that the effective frequency band of each reed overlaps that of its neighbour so as to provide a still wider total range of frequency response. For example, in a device for use with a jet engine of the type referred to above wherein the howling combustion vibrations will lie within the range of 500 to 700 C. P. S., it has been found practical to provide adequate coverage of this range by means of four reeds tuned to the frequencies of 525 C. P. S., 575 C. P. S., 625 C. P. S. and 675 C. P. S. The bands of response of such reeds, once stimulated, overlap to provide uninterrupted coverage of the whole range of frequencies from 500 to 700 C. P. S., and the fact that the howling combustion vibrations themselves are compounded of different frequencies or are frequency modulated so as effectively to cover a band of frequencies, will always insure initial stimulation of one or other of the reeds.

The amplitude of the vibrations accompanying howling combustion are much greater than the amplitude of other engine noise vibrations, and this feature together with the characteristic frequency of howling combustion enables it to be distinguished from all other vibrations in the engine. In its broadest aspect the invention may thus be defined as the combination with a jet engine of a device secured to the jet pipe of said engine, said device comprising at least one reed mounted to have a natural frequency of oscillation within the range of frequencies of vibration accompanying howling combustion in said engine, and a warning device sensitive to a predetermined amplitude of oscillation of said reed, said reed being such as by engine vibrations other than those of howling combustion to be oscillated at amplitudes less than said predetermined amplitude, and such as by howling combustion vibrations to be oscillated at at least such predetermined amplitude.

A method of carrying the invention into practice is illustrated diagrammatically in the accompanying drawings.

In these drawings:

Figure 2 is a longitudinal section of such device on a much enlarged scale;

Figure 3 is a plan view of Figure 2 with the cover removed;

Figure 1:
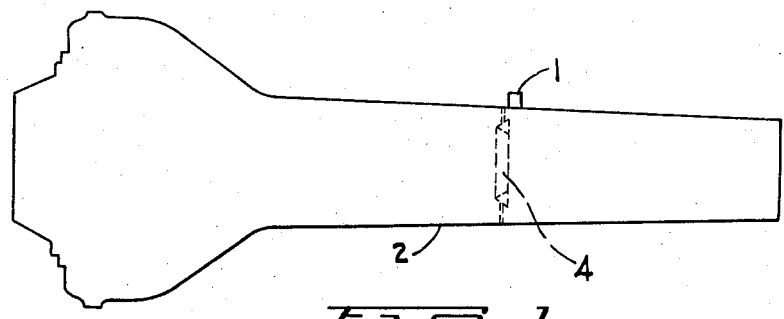
Figure 1 shows a simplified overall view of a jet engine, illustrating the preferred manner of mounting a device in accordance with the present invention on the jet pipe.

The howling combustion warning device is mounted in a casing 1 which is secured at a convenient point on the outside of the jet pipe 2 to some suitable structural member such as a bracket (not shown). This device is mounted generally in alignment with the flameholder 4, or downstream thereof, because it is in this area in the jet pipe that the transverse oscillations of howling combustion are believed to originate and reach their maximum intensity.

Referring to Figures 2 and 3, the casing 1 will be seen to comprise a central platform 5 that serves to support two steel strips 6 and 7 mounted one on each side of such platform. Each of the strips 6 and 7 is generally centrally secured to the platform by means of a suitable insulating block 8 or 9. The longitudinal position of each strip in its block may be adjusted, after which the parts are firmly secured in place by tightening screws 10 and 11. The two strips 6 and 7 act as four individual reeds, each end of each strip vibrating as a simple cantilever. It is preferred that one of the strips be moved to a position where its two ends oscillate at the upper and lower extreme frequencies require, while the other strip is adjusted to provide the two intermediate frequencies.

Each strip is constructed of stiff spring steel, a metal which was chosen because temperature fluctuations (up to about 300° C. which is the most that this device could normally be expected to encounter) have little effect on the modulus of elasticity and thus little effect on the frequency. Each strip carries at each end an electric contact 12 that co-operates with a stationary contact 13 adjustably mounted in the platform 5 by means of a screw 14 and 15. Each of the stationary contacts is electrically connected to the body 1 of the device, whereas the srips are electrically connected in parallel through leads 16 to an external insulated terminal 17.

The clearances between the contacts 12 and 13 are adjusted so as to avoid any possibility of their operation by ordinary engine noises, while still insuring that warning is provided when howling combustion commences. It is found in practice that if the clearances of the contacts are set to require an acceleration of 2g within the frequency sensitive band, one or other of the reeds will give adequate warning of howling combustion, often long before this condition is audible even to an observer not shielded from the engine.

The casing 1 is closed by a pair of lids 3 and the platform 5 is provided with a pair of apertures 5a extending through the body of the device for the entire width thereof to receive fixing bolts or the like. It will be noted that in Figure 1 the device 1 is mounted on the jet pipe 2 in such a manner that the longitudinal extent of each of the reeds is transverse to the radial direction of the jet pipe since this is believed to be the chief direction of oscillation during howling combustion. This positioning of the device is believed to produce optimum response to howling combustion.

Figure 4:
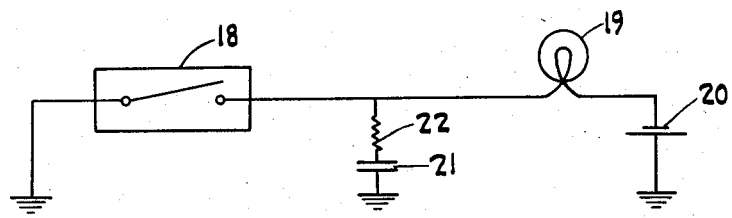
Figure 4 is a diagram of the electrical circuit that it is preferred to employ with this device.

Figure 4 illustrates a simple circuit that may be employed with this warning device. The device is shown diagrammatically at 18 as connected in a series circuit of a lamp 19 and a battery 20 representing a source of electric power. Connected in parallel with the battery and lamp and also in parallel with the detecting device is a series circuit of a condenser 21 and a resistor 22 of low resistance (about 5 ohms). In operation the battery 20 will charge the condenser 21 so that as soon as there is even momentary contact between one of the pairs of contacts of the device 18 this condenser will immediately be discharged through the low resistance circuit of device 18 and resistor 22. The condenser 21 will then be recharged by the battery 20 through the series circuit of lamp 19 and resistor 22. The lamp 19 is of comparatively high resistance in relation to the resistor 22 and thus the charging time of the condenser 21 is longer than its discharging time and the lamp glows for an appreciable period. This period is found sufficient in practice to bridge the gaps between establishment of contact in the device 18 due to oscillation of the reed, so that virtually permanent illumination of the lamp 19 results.

Figure 5:
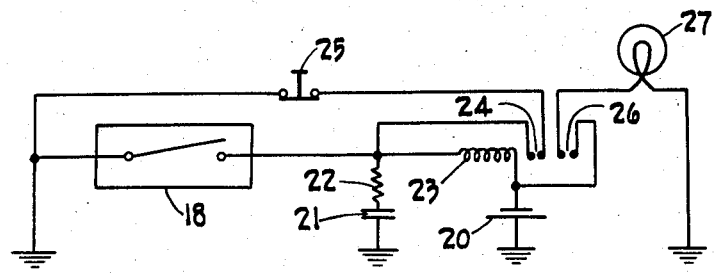
Figure 5 is a diagram of an alternative circuit.

It will, of course, be apparent that this lamp could be replaced by some form of audible warning device, or that it may be replaced by a relay as shown in Figure 5 where the battery 20 is arranged in series with a relay coil 23. Once the relay coil has been energized it will remain closed through its own contacts 24 until positively reset mechanically or its energizing circuit is opened, say by push button 25. Nevertheless the condenser 21 and resistor 22 are retained in case the very short closing time of the contacts in the device 18 should prove insufficient to energize the relay 23. A second pair of contacts 26 of the relay 23 can then be employed to illuminate a lamp 27 as before, or energize some other warning device. It is, of course, possible to connect this warning system directly to the throttle of the engine so as automatically to reduce the supply of fuel so long as howling combustion persists. The warning devices referred to above would then be replaced by a suitable solenoid arranged to act on the throttle control valve.

We claim:

The combination with a jet engine of a device secured to the exterior of the jet pipe of said engine, said device comprising an elongated casing having a central platform, end walls, side walls and cover members defining within said casing a pair of elongated cavities one on each side of said platform, an insulating block mounted centrally of each cavity, a spring steel strip mounted in each of said blocks to project to both sides thereof to form two independent reeds, the strip being adjustable longitudinally whereby to vary the natural frequency of oscillation of the reeds, four electric contacts secured one to each free end of each of said strips, four stationary contacts mounted on said platform each respectively in register with one of said contacts mounted on a strip, each such pair of contacts so formed being arranged electrically in parallel, and a warning circuit sensitive to intermittent contact between any such pair of contacts, the four reeds formed by the strips each having a natural frequency of oscillation different from the other reeds, the frequencies of all four reeds being substantially uniformly distributed within the required band and the clearances of such contacts being sufficient to effect intermittent contact between a pair of said contacts only as a result of vibrations in said engine resulting from howling combustion.

(References on following page)

References Cited in the file of this patent

UNITED STATES PATENTS

| | | |
|---|---|---|
| 1,397,525 | Kennedy | Nov. 22, 1921 |
| 2,163,195 | Edwards | June 20, 1939 |
| 2,519,015 | Bensen | Aug. 15, 1950 |
| 2,678,430 | Loescher | May 11, 1954 |

FOREIGN PATENTS

| | | |
|---|---|---|
| 261,384 | Great Britain | Oct. 6, 1927 |

OTHER REFERENCES

Article on page 65 of the April 20, 1953, issue of Aviation Week titled "Vibration Pick-Up." (Copy in Div. 42.)